United States Patent
Koga et al.

(10) Patent No.: US 7,773,935 B2
(45) Date of Patent: Aug. 10, 2010

(54) BROADCAST INFORMATION RECEIVING TERMINAL

(75) Inventors: Akio Koga, Osaka (JP); Norihiro Matsui, Osaka (JP); Kouji Kobayashi, Osaka (JP); Yuji Doi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 868 days.

(21) Appl. No.: 11/658,558

(22) PCT Filed: Feb. 28, 2006

(86) PCT No.: PCT/JP2006/303700
§ 371 (c)(1),
(2), (4) Date: Jan. 25, 2007

(87) PCT Pub. No.: WO2006/093123
PCT Pub. Date: Sep. 8, 2006

(65) Prior Publication Data
US 2008/0311869 A1    Dec. 18, 2008

(30) Foreign Application Priority Data
Mar. 3, 2005 (JP) .............................. 2005-058541

(51) Int. Cl.
*H04Q 7/32* (2006.01)
(52) U.S. Cl. .................... 455/3.01; 455/2.01; 455/3.06; 455/550.1; 455/414.1; 455/414.3; 725/62; 725/63; 725/68; 725/70
(58) Field of Classification Search ....... 455/3.01–3.06, 455/403, 414.1, 414.3, 418–420, 422.1, 466, 455/550.1, 566, 567, 500, 517, 575.1; 725/62, 725/63, 68, 70
See application file for complete search history.

(56) References Cited

U.S. PATENT DOCUMENTS

| 2003/0122959 A1* | 7/2003 | Ishida et al. ............. 348/426.1 |
| 2003/0159144 A1 | 8/2003 | Kitagawa et al. |
| 2004/0052504 A1* | 3/2004 | Yamada et al. ................ 386/68 |

FOREIGN PATENT DOCUMENTS

CN    1434632    8/2003

(Continued)

OTHER PUBLICATIONS

Chinese Office Action issued on Apr. 17, 2009 in the corresponding Chinese application.

*Primary Examiner*—Keith T Ferguson
(74) *Attorney, Agent, or Firm*—Wenderoth, Lind & Ponack, L.L.P.

(57) ABSTRACT

A broadcast information receiving terminal which notifies a user, when a broadcast program is unreceivable, of such unreceivability, and also notifies the user, when a reception of the broadcast program has been recovered, of such recovery of the reception is provided. In the broadcast information receiving terminal which reproduces a TV number or the like, an at-reception-recovery-time processing preprogramming control section (3) determines, when a reception of a desired broadcast program which was determined as unreceivable has been recovered, whether or not to notify the user that the reception of the broadcast program has been recovered. An at-reception-recovery-time processing section (7) notifies the user that the reception of the desired broadcast information has been recovered.

12 Claims, 9 Drawing Sheets

FOREIGN PATENT DOCUMENTS

| | | |
|---|---|---|
| JP | 2003-061004 | 2/2003 |
| JP | 2003-219303 | 7/2003 |
| JP | 2003-244571 | 8/2003 |
| JP | 2004-040380 | 2/2004 |
| JP | 2004-064120 | 2/2004 |

* cited by examiner

ALTHOUGH PROGRAM ○○ IS STARTIG SOON, THE PROGRAM WILL NOT CHANGE DUE TO RECEPTION INCAPABILITY.

BROADCAST INFORMATION RECEIVING TERMINAL

TECHNICAL FIELD

The present invention relates to a broadcast information receiving terminal for receiving and reproducing broadcast information (broadcast program) included in a broadcast wave and more particularly to a broadcast information receiving terminal which notifies, when the broadcast information is unreceivable, a user of reception incapability, and also notifies, when a reception of the broadcast information has been recovered, the user of a reception recovery.

BACKGROUND ART

A broadcast information receiving terminal is a movable terminal capable of receiving and reproducing broadcast information contained in a broadcast wave. The broadcast information receiving terminal is required to receive a broadcast wave anywhere and to reproduce broadcast information included in the broadcast wave. Thus, when broadcast information receiving terminal is incapable of receiving the broadcast information, for example, during movement of the terminal, the broadcast information receiving terminal is required to notify a user of such incapability.

Figure 12:
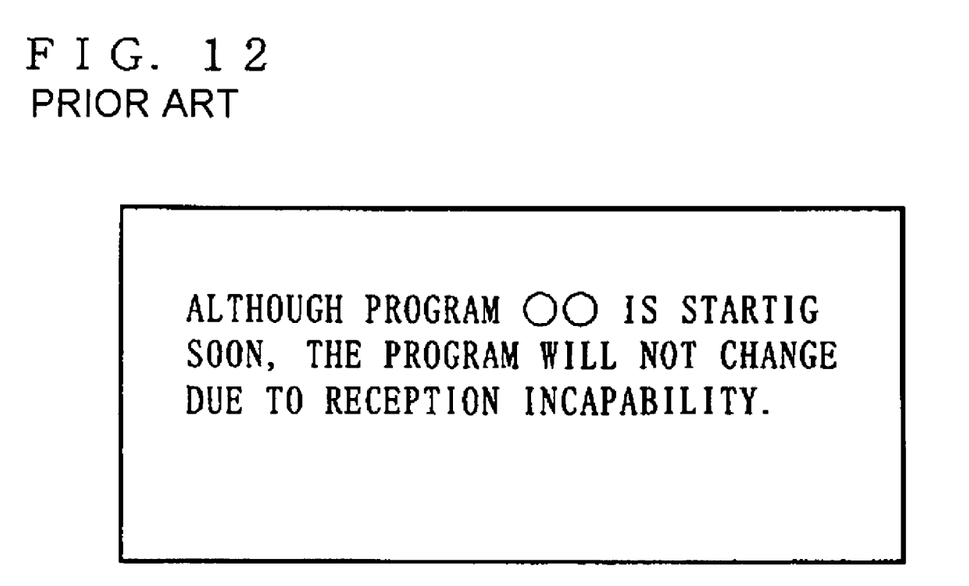
FIG. 12 is a diagram illustrating an example of a screen to be displayed when a conventional on-vehicle broadcast receiving terminal has failed to receive a broadcast program.

As a conventional broadcast information receiving terminal, there is a non-vehicle broadcast receiving terminal which indicates on a screen, when a broadcast program fails to be received, that the broadcast program is unreceivable (See, e.g. Patent Document 1.). FIG. 12 is a diagram illustrating an example of a screen displayed when the conventional on-vehicle broadcast receiving terminal fails to receive the broadcast program. The conventional on-vehicle broadcast receiving terminal displays, when a broadcast program fails to be received, a screen as shown in FIG. 12, and notifies a user that the program is unreceivable. Patent Document 1: Japanese Laid-Open Patent Publication No. 2003-61004

DISCLOSURE OF THE INVENTION

Problems to be Solved by the Invention

However, the conventional on-vehicle broadcast receiving terminal notifies the user, when the broadcast program fails to be received, that the program is unreceivable, but no processing has been performed even though the broadcast program becomes receivable afterward. Thus, there has been a problem that the user does not notice the reception recovery of the broadcast program and consequently fails to view the broadcast program.

Particularly in the case where the broadcast information receiving terminal is a cellular phone, a user of the cellular phone is, when the user confirms that a broadcast program has failed to be received, likely to keep the cellular phone in a pocket, a bag or the like temporarily. In such a case, the user is less likely to notice that reception of the broadcast program has been recovered, and consequently the above-mentioned problem occurred noticeably.

Therefore, an object of the present invention is to provide a broadcast information receiving terminal which, when a reception of broadcast information has been recovered, notifies a user that the reception of the broadcast information has been recovered, and which prevents the user from failing to view the program without noticing the reception recovery of the broadcast program.

Solution to the Problems

The present invention is directed to a broadcast information receiving terminal which receives and reproduces broadcast information included in a broadcast wave. Further, in order to attain the above objects, the broadcast information receiving terminal according to the present invention comprises a broadcast information receiving section, a reception state determining section, a reproducing section, a display section, an at-reception-recovery-time processing preprogramming control section, and an at-reception-recovery-time processing section. The broadcast information receiving section receives the broadcast information included in the broadcast wave. The reception state determining section determines a reception state of desired broadcast information included in the broadcast wave. The reproducing section reproduces the desired broadcast information determined, by the reception state determining section, as receivable. The display section displays the broadcast information reproduced by the reproducing section. The at-reception-recovery-time processing preprogramming control section determines, when a reception of the desired broadcast information, which was determined, by the reception state determining section, as unreceivable has been recovered, whether or not to notify a user that a reception of the broadcast information has been recovered. The at-reception-recovery-time processing section notifies the user, according to an instruction made by the at-reception-recovery-time processing preprogramming control section, that the reception of the desired broadcast information has been recovered.

Preferably, the at-reception-recovery-time processing preprogramming control section accepts a registration of a preprogramming for notifying the user, when the reception of the desired broadcast information has been recovered, that the reception of broadcast information has been recovered, outputs an inquiry, to the reception state determining section, inquiring, only when the preprogramming is registered, whether or not the reception of the desired broadcast information which was determined as unreceivable has been recovered, and notifies the user, when the reception state determining section determines that the reception of the desired broadcast information has been recovered, that the reception of the broadcast information has been recovered.

Preferably, the at-reception-recovery-time processing preprogramming control section indicates on the display section, when the reception state determining section determines the desired broadcast information is unreceivable, that the desired broadcast information is unreceivable.

Preferably, the at-reception-recovery-time processing preprogramming control section accepts a setting of a notification method for notifying the user that the reception of the desired broadcast information has been recovered, and notifies the user, when the reception of the desired broadcast information, which was determined as unreceivable by the reception state determining section, has been recovered, that the reception of the broadcast information has been recovered, by the set notification method. For example, the notification method may be a notification method that applies a vibrational alert function.

Further, the broadcast information receiving terminal may further comprise a manner mode section having a manner mode set therein. In this case, the at-reception-recovery-time processing section changes, based on whether or not the manner mode is set in the manner mode section, the notification method for notifying the user that the reception of the desired broadcast information has been recovered.

Further, the broadcast information receiving terminal may also comprise a timer section for outputting time information. In this case, the at-reception-recovery-time processing preprogramming control section accepts a setting of a time period during which the reception recovery of the broadcast information is to be notified, and notifies the user, based on the time information outputted from the timer section, only during the set time period, that the reception of the broadcast information has been recovered.

Further, the reproducing section may include an electronic program information extraction section for extracting electronic program information from the broadcast wave. In this case, the at-reception-recovery-time processing preprogramming control section accepts a setting of a program, for which the reception recovery of the broadcast information is to be notified, and notifies the user, based on the extracted electronic program information, only for the set program, that the reception of the broadcast information has been recovered.

Further, the at-reception-recovery-time processing section may include a recording section for recording the broadcast information to be reproduced by the reproducing section. In this case, the recording section records, when the reception of the broadcast information has been recovered, the recovered broadcast information.

Further, each component included in the above-described broadcast information receiving terminal may be viewed as a method for providing the broadcast information receiving terminal with a series of processing procedures. That is, in the broadcast information receiving terminal, the method includes a broadcast information receiving step of receiving broadcast information included in a broadcast wave, a reception state determining step of determining a reception state of desired broadcast information included in the broadcast wave, a reproducing step of reproducing the desired broadcast information determined, by the reception state determining step, as receivable, a display step of displaying the broadcast information reproduced by the reproducing step, a step of determining, when a reception of the desired broadcast information which was determined, by the reception state determining step, as unreceivable has been recovered, whether or not to notify a user that a reception of the broadcast information has been recovered, and a step of notifying the user that the reception of the desired broadcast information has been recovered according to an instruction made by the determining step.

Preferably, the method is provided in a form of a program which enables the broadcast information receiving terminal to execute the series of the processing procedures. The program may be stored in a computer-readable storage medium.

Further, the present invention is directed to an integrated circuit of the broadcast information receiving terminal for receiving and reproducing broadcast information included in a broadcast wave. In addition, in order to attain the above objects, the broadcast information receiving terminal comprises a broadcast information receiving section for receiving the broadcast information included in the broadcast wave, a reproducing section for reproducing the received broadcast information, and a display section for displaying the broadcast information reproduced by the reproducing section. Further, the integrated circuit comprises a reception state determining section for determining a reception state of desired broadcast information included in the broadcast wave, an at-reception-recovery-time processing preprogramming control section for determining, when a reception of the desired broadcast information which was determined, by the reception state determining section, as unreceivable has been recovered, whether or not to notify a user that a reception of the broadcast information has been recovered, and an at-reception-recovery-time processing section for notifying the user, according to an instruction made by the at-reception-recovery-time processing preprogramming control section, that the reception of the desired broadcast information has been recovered.

EFFECT OF THE INVENTION

The broadcast information receiving terminal according to the present invention displays on a screen, when a reception of broadcast information selected by a user is impossible, a reception impossible notification for notifying such incapability. Thus, the user can be notified that the broadcast information is unreceivable. Further, when a reception of the broadcast information has been recovered, a reception recovery notification is displayed on the screen. Thus such a problem can be avoided that the user does not notice the reception recovery of the broadcast information and consequently misses the broadcast information.

Further, the broadcast information receiving terminal of the present invention notifies the user, only when a preprogramming for notifying the reception recovery of the broadcast information (i.e., reception recovery preprogramming) is registered, that the reception of the broadcast information has been recovered. Therefore, even in the case where viewing has been recovered, if the user does not wish, a notification will not be made.

Further, the broadcast information receiving terminal of the present invention is capable of making, when the reception of the broadcast information has been recovered, the reception recovery notification by a method other than screen displaying. For example, in the case where the broadcast information receiving terminal is a cellular phone, the broadcast information receiving terminal may make the reception recovery notification with sound through a speaker of the cellular phone. Further, the reception recovery notification may be made by sending a mail to the cellular phone itself. Further, the reception recovery notification may be made with a vibrating alert function. Moreover, one of these functions may be selected depending on the user's preference. Accordingly, the broadcast information receiving terminal is capable of making the reception recovery notification with a method desired by the user.

Further, the broadcast information receiving terminal of the present invention notifies the user that the reception of the broadcast information has been recovered only during a time period designated by the user. Accordingly, during the time period unwished by the user, for example, during a bet time and after completion of a desired program, an at-reception-recovery-time notification will not be made.

The broadcast information receiving terminal of the present invention is also capable of changing a method for notifying the user that the reception of broadcast information has been recovered according to circumstances. Accordingly, the method of the reception recovery notification may be changed depending on whether or not a manner mode is set, and when another function is being used, the method of the reception recovery notification may be changed in order not to interrupt the other function being used.

Further, the broadcast information receiving terminal of the present invention includes a recording section for recording broadcast information which is reproduced by the reproducing section, and the recording section records, when the reception of the broadcast information has been recovered, the recovered broadcast information. Accordingly, even though the user is not able to view the desired broadcast information as soon as the reception has been recovered, viewing is possible with the recorded broadcast information, which consequently improves the convenience for the users.

BRIEF DESCRIPTION OF THE DRAWINGS

FIG. 8 is a flow chart showing an example of a detailed operation of step S8a.

DESCRIPTION OF THE REFERENCE CHARACTERS 1 broadcast information receiving section
2 reception state determining section
3, 3a at-reception-recovery-time processing preprogramming control section
4 reproducing section
5 input section
6 display section
60 display screen
7 at-reception-recovery-time processing section
8 timer section
9 manner mode section

BEST MODE FOR CARRYING OUT THE INVENTION

Hereinafter, embodiments of the present invention will be described with reference to the drawings.

First Embodiment

Figure 1:
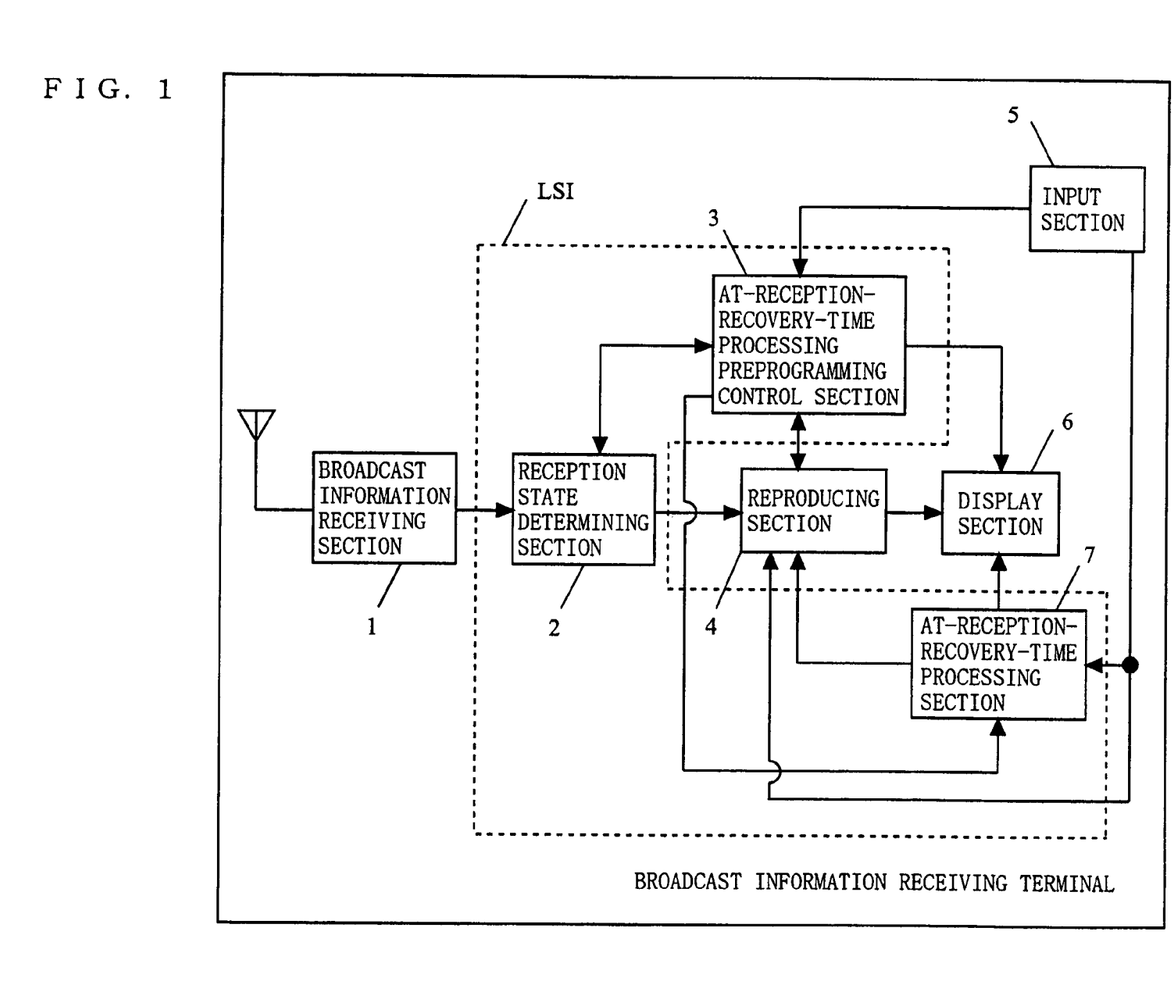
FIG. 1 is a block diagram illustrating an example of a constitution of the broadcast information receiving terminal according to a first embodiment of the present invention.

FIG. 1 is a block diagram illustrating an example of a constitution of a broadcast information receiving terminal according to a first embodiment of the present invention.

Referring to FIG. 1, the broadcast information receiving terminal comprises a broadcast information receiving section 1, a reception state determining section 2, an at-reception-recovery-time processing preprogramming control section 3, a reproducing section 4, an input section 5, a display section 6, and an at-reception-recovery-time processing section 7.

The broadcast information receiving terminal of the present invention is supposed to be applied to a hand-held terminal (such as a cellular phone), and is also applicable to a car navigation system and a PDA (Personal Digital Assistant).

The broadcast information receiving section 1 is, for example, capable of containing a TV antenna. The broadcast information receiving section 1 receives a broadcast wave containing broadcast information (broadcast program) transmitted by a broadcast station, and obtains the broadcast information relating to user-selectable channels. The broadcast information is data in which various types of data such as moving pictures and sound are mixed and multiplexed.

The reception state determining section 2 has a function of analyzing the broadcast information received by the broadcast information receiving section 1, determining, based on the obtaining state of the broadcast information as well as analysis results of the broadcast information, whether or not desired broadcast information is receivable, and then notifying other components of the above determination results. For example, when the broadcast information receiving terminal receives a digital TV broadcast, the reception state determining section 2 may determine, based on obtainability of a PMT (Program Map Table), whether or not the broadcast information is receivable. In this case, the reception state determining section 2 determines that the broadcast information is receivable when the PMT is obtainable, and determines that broadcast information is not receivable when the PMT is not obtainable. Further, the reception state determining section 2 may determine that the broadcast information is receivable in the case where the broadcast information is at a viewable level or in the case where the broadcast information is at an audible level.

The reproducing section 4 has, for example in the inside, a means for demultiplexing multiplexed broadcast information in order to extract the desired broadcast information (e.g. demux) and a means for decoding the extracted broadcast information (e.g. decoder). The reproducing section 4 demultiplexes and decodes the broadcast information received from the reception state determining section 2 with the demux and the decoder, respectively.

The display section 6 is, for example, a display, and displays the desired broadcast information, an image and the like corresponding to a channel selected by a user. For example, the input section 5 detects a user input made by the user's pressing a button provided in the broadcast information receiving terminal, and notifies a content corresponding to the input to other components. The button may be, for example, a button of a remote controller used for a remote operation in the case where the broadcast information receiving terminal is a car navigation system.

The at-reception-recovery-time processing preprogramming control section 3 transmits, to the display section 6, an image or a message to display a reception impossible notification when receiving, from the reception state determining section 2, a determination result that a reception of the desired broadcast information is impossible. The reception impossible notification is a notification to notify the user that reception of the broadcast information is impossible. Further, the at-reception-recovery-time processing preprogramming control section 3 accepts an at-reception-recovery-time processing preprogramming from the user when the reception of the broadcast information has been recovered. The at-reception-recovery-time processing preprogramming is a preprogramming regarding whether or not a reception recovery of the broadcast information is to be notified to the user through a predetermined processing when the reception of the broadcast information has been recovered. When the at-reception-recovery-time processing preprogramming has been made, the at-reception-recovery-time processing preprogramming control section 3 requests the reception state determining section 2 to determine whether or not the reception of the broadcast information has been recovered, and then passes the result to the at-reception-recovery-time processing section 7.

Upon receiving, from the at-reception-recovery-time processing preprogramming control section 3, a determination result that the desired broadcast information is receivable, the at-reception-recovery-time processing section 7 sends, to the display section 6, a screen or a message to display a reception recovery notification. The reception recovery notification is a notification to notify the user that the reception of the broadcast information has been recovered. The at-reception-recovery-time processing section 7 makes the reception recovery notification to the user, and then instructs, given that an instruction for reproducing the broadcast information is made, the reproducing section 4 to reproduce the broadcast information.

Figure 2:
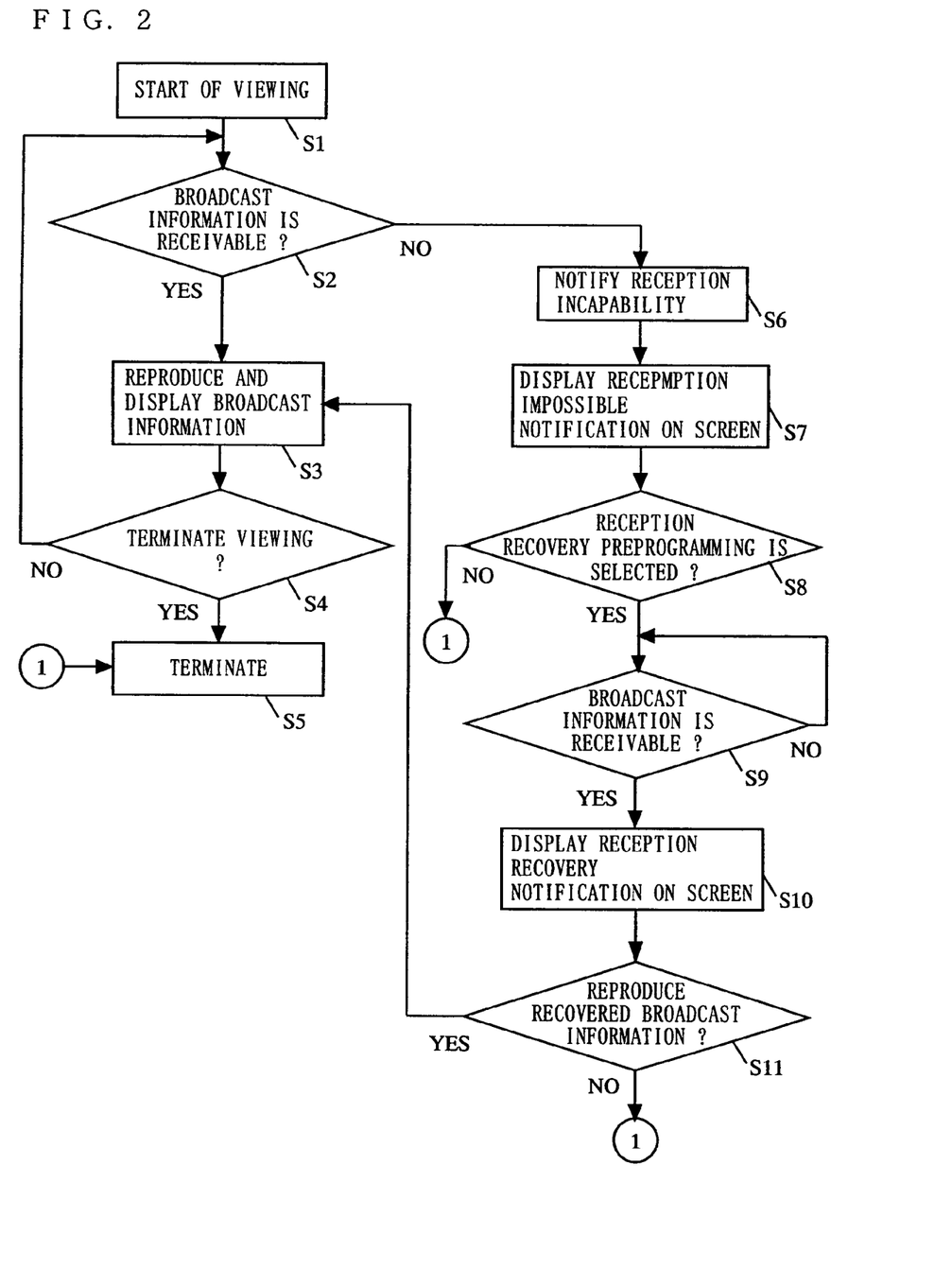
FIG. 2 is a flow chart showing an example of an operation of the broadcast information receiving terminal according to the first embodiment of the present invention.

FIG. 2 is a flow chart illustrating an example of an operation of the broadcast information receiving terminal according to the first embodiment of the present invention. Referring to FIG. 2, using the broadcast information receiving terminal carrying a broadcast information receiving application, the user starts, with the use of the input section 5, the broadcast information receiving application, selects a program the user desires to view, and starts viewing the program (step S1).

After start of viewing, the broadcast information receiving section 1 receives the broadcast wave including the broadcast information, and then sends the broadcast information to the reception state determining section 2. The reception state determining section 2 analyzes the broadcast information received by the broadcast information receiving section 1, and, based on the broadcast information obtaining state and the analysis results of the broadcast information, determines whether the broadcast information the user has selected is receivable or not (step S2).

When the reception state determining section 2 has determined that the broadcast information the user has selected is receivable, the reception state determining section 2 notifies the reproducing section 4 of the broadcast information. The reproducing section 4 reproduces the broadcast information received from the reception state determining section 2, and displays a video on the display section 6 (step S3).

When the user chooses, using the input section 5, to finish viewing, the broadcast information receiving terminal executes termination processing of the broadcast information receiving application, and terminates a series of processes from a reception of the broadcast information to video display (steps S4, S5). On the other hand, when the user does not select, using the input section 5, to finish viewing, the broadcast information receiving terminal returns to an operation of step 2 and determines again whether the broadcast information the user has selected is receivable or not.

When the reception state determining section 2 determines, in step S2, that the broadcast information the user has selected is unreceivable, the reception state determining section 2 sends the reception impossible notification indicating such unreceivability to the at-reception-recovery-time processing preprogramming control section 3 (step S6).

Figure 3:
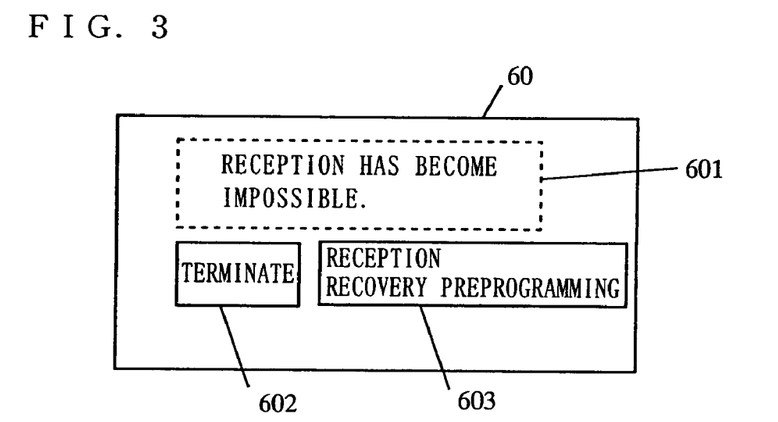
FIG. 3 is a diagram illustrating an example of a reception impossible notification which is displayed on the display section 6.

Upon receipt of the reception impossible notification, the at-reception-recovery-time processing preprogramming control section 3 sends, to the display section 6, the screen or the message indicating the reception impossible notification. As a result, the display section 6 displays the screen or the message indicating the reception impossible notification (step S7). FIG. 3 is a diagram illustrating an example of the reception impossible notification displayed on the display section 6. Referring to the FIG. 3, the display section 6 displays, as the reception impossible notification, on the display screen 60, a message 601 indicating that the desired broadcast information has become unreceivable, and two input buttons 602 and 603, both of which are configured with GUI (Graphical User Interface) (a terminate button and a reception recovery preprogramming button, for this example). Accordingly, the user is able to choose to terminate viewing of the broadcast information by pressing the input button 602, or choose to set the at-reception recovery-time preprogramming by pressing the input button 603.

In other words, the screen or the message displayed on the display section 6 prompts the user's input. The at-reception-recovery-time processing preprogramming control section 3 determines, using the input section 5, a selection inputted by the user. Specifically, the at-reception-recovery-time processing preprogramming control section 3 determines, using the input section 5, whether a selection for setting the at-reception-recovery-time preprogramming has been inputted or a selection for terminating the reception of the broadcast information has been inputted by the user (step S8).

In the case where the selection for terminating the reception of the broadcast information has been inputted by the user, the broadcast information receiving terminal executes the termination processing of step S5. Thus, the broadcast information receiving terminal will not make the at-reception-recovery-time notification if the user does not wish. On the other hand, in the case where the selection for setting the at-reception-recovery-time preprogramming has been inputted, the at-reception-recovery-time processing preprogramming control section 3 requests the reception state determining section 2 to determine whether broadcast information corresponding to the channel selected by the user is receivable or not. The reception state determining section 2 which has received the request analyzes the broadcast information received by the broadcast information receiving section 1, and determines whether the broadcast information selected by the user is receivable or not (step S9).

When determining that the broadcast information is receivable, the reception state determining section 2 notifies the at-reception-recovery-time processing preprogramming control section 3 that the broadcast information is receivable. Upon reception of such notification, the at-reception-recovery-time processing preprogramming control section 3 notifies the at-reception-recovery-time processing section 7 that the broadcast information is receivable. Upon reception of the notification, the at-reception-recovery-time processing section 7 sends the screen or the message showing the reception recovery notification to the display section 6. As a result, the display section 6 displays the screen or the message showing the reception recovery notification (step S10).

Figure 4:
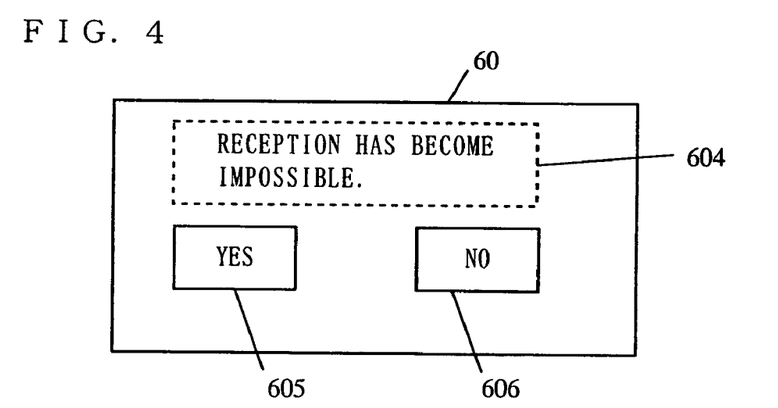
FIG. 4 is a diagram illustrating an example of a reception recovery notification which is displayed on the display section 6.

FIG. 4 is a diagram illustrating an example of the reception recovery notification displayed on the display section 6. Referring to FIG. 4, the display section 6 displays as the reception recovery notification, on the display screen 60, a message 604 for inquiring of the user about whether the user intends to view the recovered broadcast information and two input buttons 605 and 606 (Yes button and No button for this example) both of which are configured with GUI. Accordingly, the user can input either the selection of resuming viewing of the recovered broadcast information by pressing the input button 605, or the selection of terminating viewing of the broadcast information without restarting viewing of the recovered broadcast information by pressing the input button 606.

The at-reception-recovery-time processing section 7 determines, using the input section 5, the selection the user has inputted. Specifically, the at-reception-recovery-time processing section 7 determines whether the selection for resuming viewing the recovered broadcast information has been inputted or the selection for terminating viewing the broadcast information has been inputted (step S11).

When the user has inputted the selection for resuming viewing the recovered broadcast information (that is, when the input button 605 has been pressed), the at-reception-recovery-time processing section 7 instructs the reproducing section 4 to reproduce the broadcast information selected by the user. The reproducing section 4 reproduces the instructed broadcast information, and displays the video on the display section 6 (step S4). The at-reception-recovery-time processing section 7 may resume viewing without displaying a screen shown in FIG. 4 on the display section 6. On the other hand, the at-reception-recovery-time processing section 7 executes the termination processing of step S5 when the user inputs the selection for terminating viewing of the broadcast information (that is, when the input button 606 is pressed).

As described above, the broadcast information receiving terminal according to the first embodiment of the present invention displays, on the screen, when the reception of broadcast information selected by a user is impossible, the reception impossible notification notifying such impossibility. Thus, it is possible to notify the user that the broadcast information is not receivable. In addition, when the reception of the broadcast information has been recovered, the reception recovery notification, notifying such recovery, is displayed on the screen. As a result, it is possible to avoid a problem that the user misses the broadcast information without noticing that the reception of the broadcast information has been recovered.

Further, only in the case where the preprogramming for notifying that the reception of the broadcast information has been recovered (i.e. reception recovery preprogramming) is registered, the reception recovery of the broadcast information will be notified to the user. Thus, although viewing has been recovered, the notification may be cancelled if the user does not wish.

Further, although the broadcast information receiving terminal displays, when the reception of the broadcast information has been recovered, the screen as shown in FIG. 4, and makes the reception recovery notification which notifies the user that the reception of the broadcast information has been recovered, the reception recovery notification can be made with the use of a method other than the screen display. For example, in the case where the broadcast information receiving terminal is a cellular phone, the broadcast information receiving terminal may make the reception recovery notification with sound through a speaker of the cellular phone. It is also possible to make the reception recovery notification by sending a mail to the cellular phone itself. It is also possible to make the reception recovery notification using a vibrational alert function. Furthermore, the user may select any of these functions according to the user's preference. Accordingly, the broadcast information receiving terminal is capable of making the reception recovery notification by such a method as the user desires.

Figure 5:
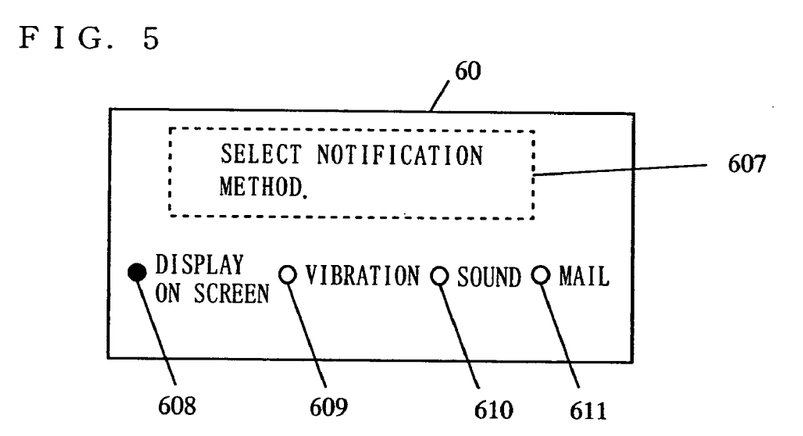
FIG. 5 is a diagram illustrating an example of a screen for setting a type of the reception recovery notification displayed on the display section 6.

FIG. 5 is a diagram illustrating an example of a screen for setting a type of the reception recovery notification displayed on the display section 6. The broadcast information receiving terminal displays the screen as shown in FIG. 5, after the reception recovery preprogramming has been selected (that is, after the reception recovery preprogramming has been selected on the screen shown in FIG. 3) or at another timing, and allows the user to select a method for the reception recovery notification. In such a case, the display screen 60 of the broadcast information receiving terminal displays a message 607 which prompts a selection of a notification method and selection items 608 to 611 all of which are configured with GUI and the like. For example, there is a circle situated to the left of each of the selection items 608 to 611, and a black circle is displayed for an actually selected item. According to an example shown in FIG. 5, the selection item 608 (that is, the display screen) is selected. The user may select each selection item as necessary by operating the input section 5.

When the screen like this is displayed on the display screen 60, the user previously selects one of the selection items 608 to 611 by operating the input section 5. The item selected by the user is retained in a storage means (such as a memory or a hard disk) contained in the broadcast information receiving terminal, and the reception recovery notification corresponding to the selected item is to be made when the reception of the broadcast information has been recovered. Accordingly, the broadcast information receiving terminal is capable of making the reception recovery notification in accordance with the user's request.

Second Embodiment

Figure 6:
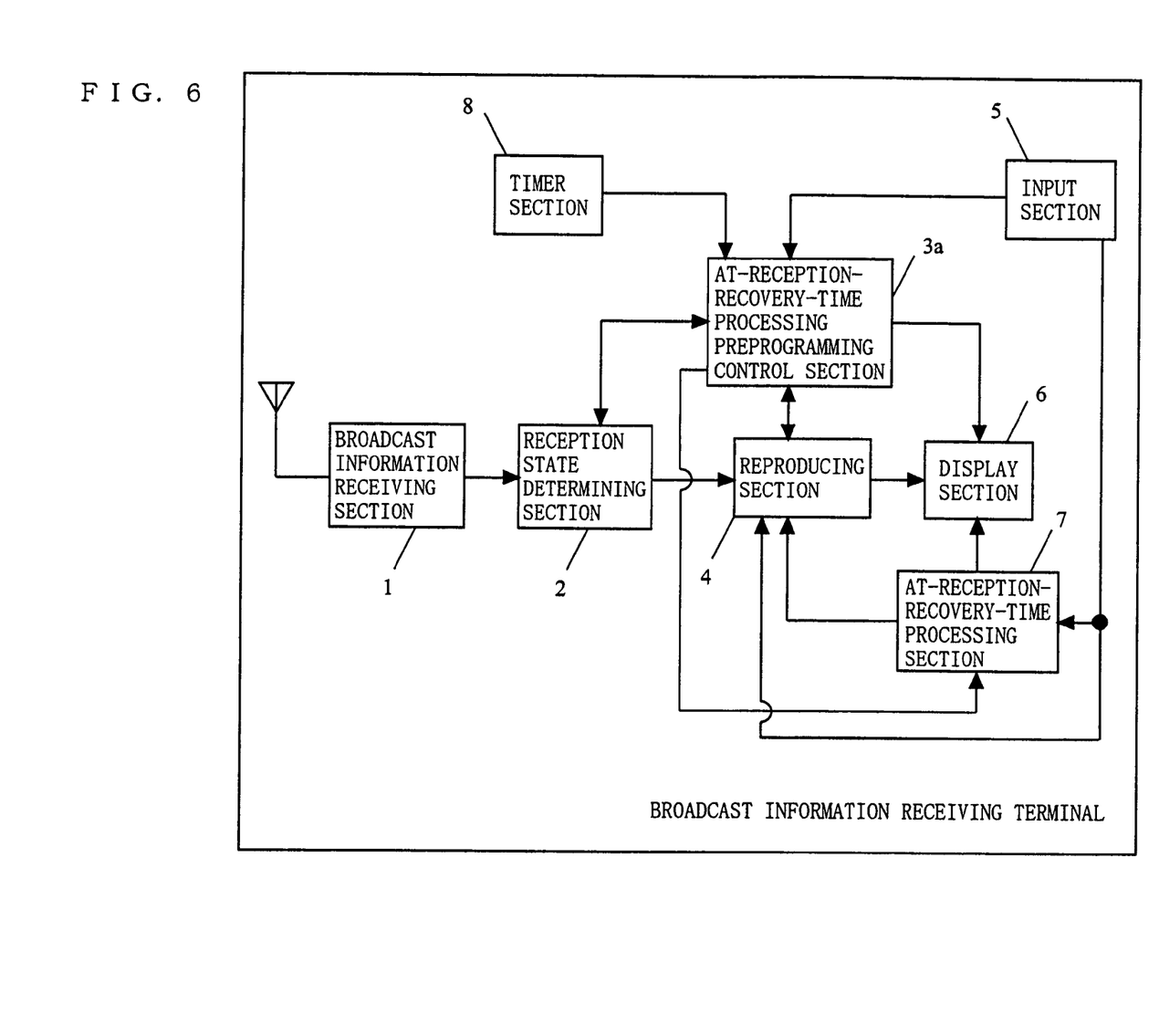
FIG. 6 is a block diagram illustrating an example of a constitution of the broadcast information receiving terminal according to a second embodiment of the present information.

FIG. 6 is a block diagram showing an example of a constitution of a broadcast information receiving terminal according to a second embodiment of the present invention. Referring to FIG. 6, the broadcast information receiving terminal according to the second embodiment of the present invention is additionally equipped with a timer section 8 for outputting time information as compared to the first embodiment. With the timer section 8, the broadcast information receiving terminal according to the second embodiment is capable of notifying a user that a reception of broadcast information has been recovered only during the time period preprogrammed by the user.

Figure 7:
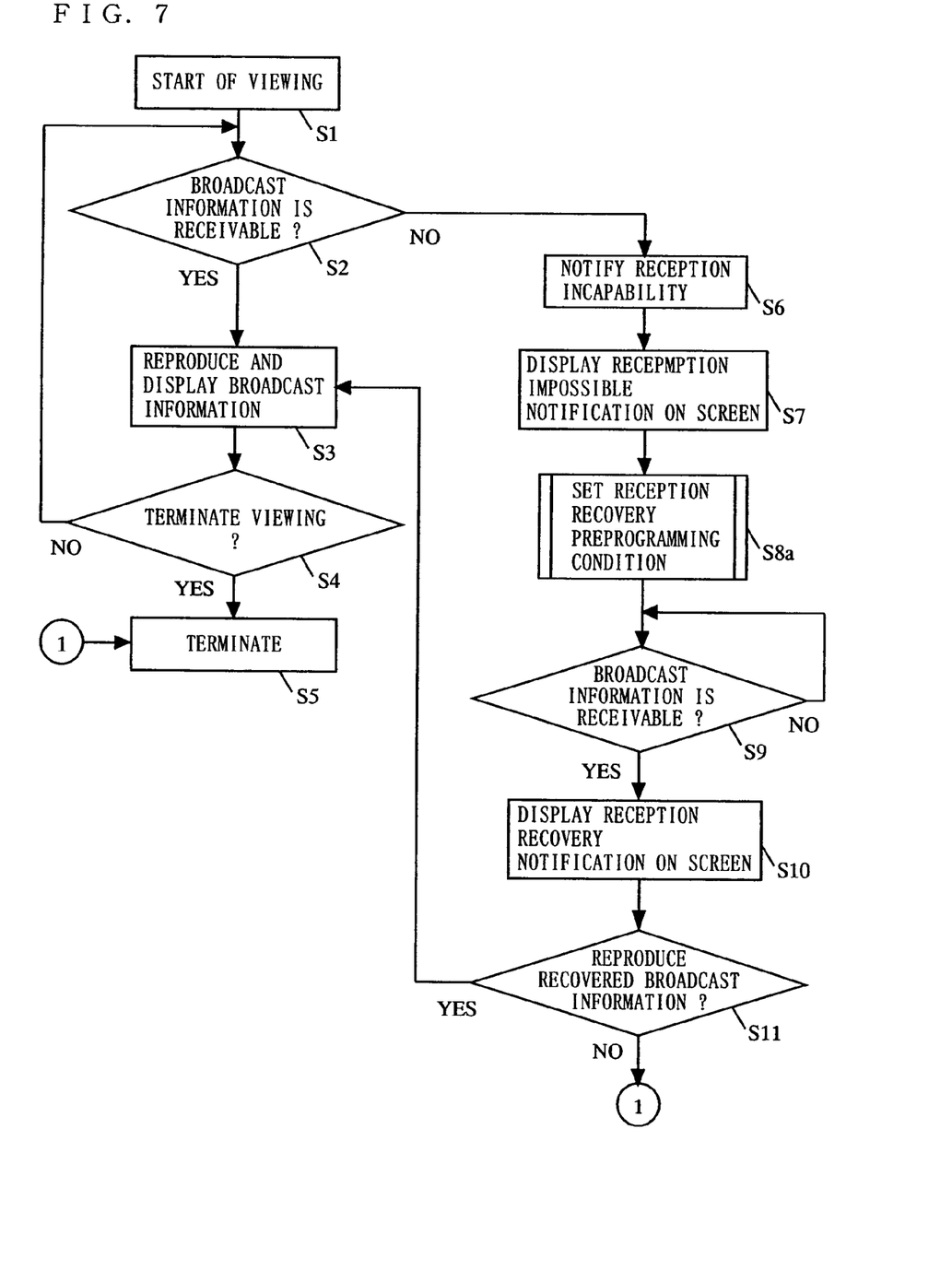
FIG. 7 is a flow chart showing an example of an operation of the broadcast information receiving terminal according to the second embodiment of the present invention.

FIG. 7 is a flow chart illustrating an example of an operation of the broadcast information receiving terminal according to the second embodiment of the present invention. Referring to FIG. 7, the broadcast information receiving terminal according to the second embodiment implements the same operations as that according to the first embodiment shown in FIG. 2 except for an operation of step S8a. The broadcast information receiving terminal according to the second embodiment sets an at-reception-recovery-time condition (step S8a) after displaying, at step 7, the screen or the message indicating the reception impossible notification.

Figure 8:
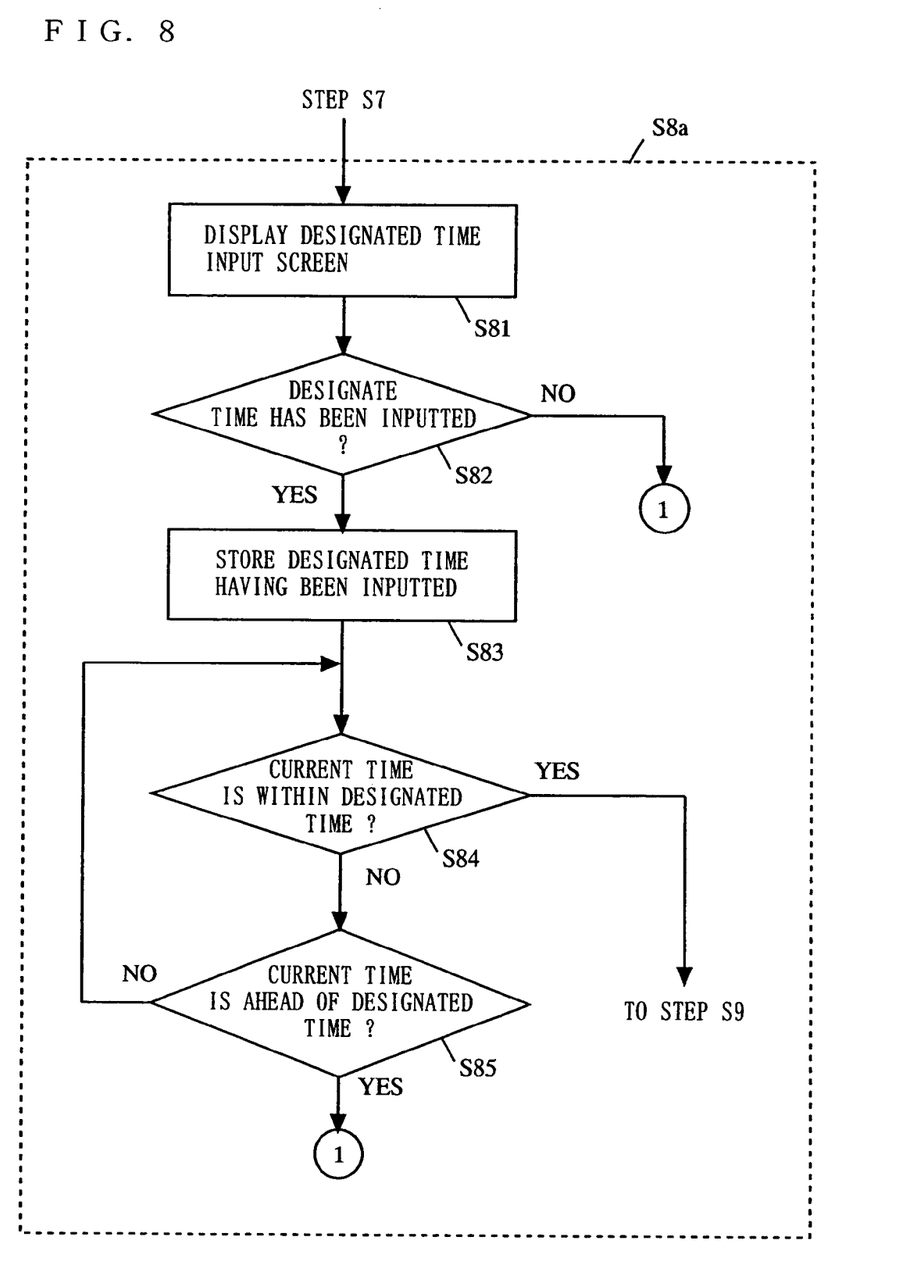

FIG. 8 is a flow chart illustrating an example of a detailed operation of step S8a. Referring to FIG. 8, the at-reception-recovery-time processing preprogramming control section 3a instructs the display section 6 to display a designated time input screen. The designated time input screen is a screen in which a time period (hereinafter, referred to as designated time) for notifying the user of the reception recovery of the broadcast information is inputted. As a result, the display section 6 displays the designated time input screen (step S81).

The broadcast information receiving terminal determines whether or not the user has inputted the designated time on the designated time input screen (step S82). In the case where the user does not input the designated time, the broadcast information receiving terminal executes the termination processing of step S5. On the other hand, in the case where the user has inputted the designated time, the at-reception-recovery-time processing preprogramming control section 3a stores the inputted designated time in a storage means (not shown) such as a memory (step S83).

Figure 9:
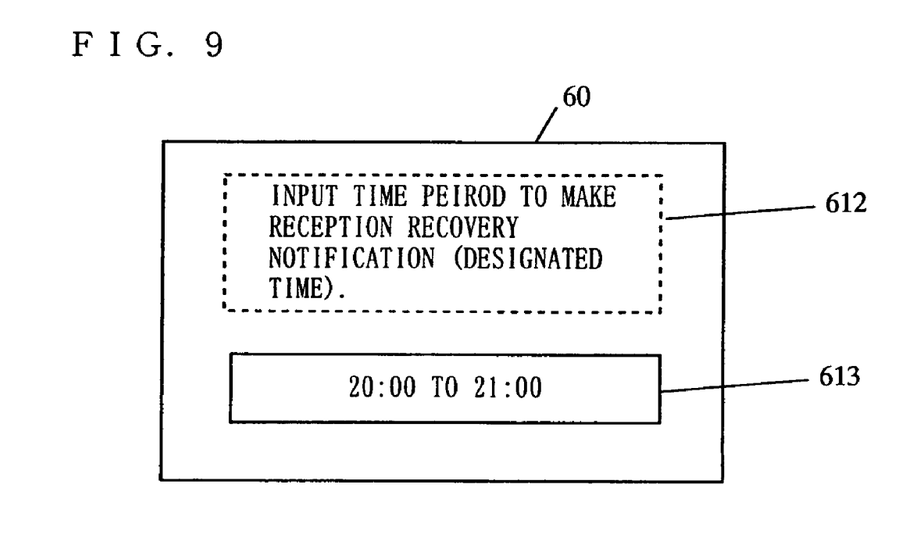
FIG. 9 is a diagram illustrating an example of a designated time input screen which is displayed on the display section 6.

FIG. 9 is a diagram illustrating an example of the designated time input screen displayed on the display section 6. Referring to FIG. 9, as the designated time input screen, the display section 6 displays, on the display section 60, a message 612 for instructing the designated time input and an input box 613 configured with GUI. Accordingly, the user can designate the input box 613 by operating the input section 5, and input a designated time as desired. According to an example shown in FIG. 9, the time period 20:00 to 21:00 is inputted as the designated time.

Next, the at-reception-recovery-time processing preprogramming control section 3a determines whether the time information obtained from the timer section 8 (that is, a current time) is within the designated time (step S84). When the current time is within the designated time, the at-reception-recovery-time processing preprogramming control section 3a proceeds to step 9, and requests the reception state determining section 2 to determine whether the broadcast information is receivable or not. On the other hand, in the case where the current time is not within the designated time, the at-reception-recovery-time processing preprogramming control section 3a determines whether or not the current time is ahead of the designated time (step S85). When the current time obtained from the timer section 8 is ahead of the designated time, the at-reception-recovery-time processing preprogramming control section 3a executes the termination processing of Step S5. On the other hand, when the current time obtained from the timer section 8 is not ahead of the designated time (that is, the current time does not reach the designated time), the at-reception-recovery-time processing preprogramming control section 3a returns to the process of step S84. The following operation is the same as that of the first embodiment.

As above described, the broadcast information receiving terminal according to the second embodiment of the present invention notifies the user that the reception of the broadcast information has been recovered only during the time period the user has preprogrammed, and thus it is possible not to make the at-reception-recovery-time notification during the time period user does not wish such as during a bed time and after a completion of a desired program.

Although the broadcast information receiving terminal according to the present embodiment notifies that the reception of the broadcast information has been recovered only during the time period designated by the user, the reception recovery of the broadcast information may be notified to the user for each program preprogrammed by the user, for example, with the use of EPG (Electric Program Guide) information corresponding to electronic program information of data representing a TV program. In such a case, the broadcast information receiving terminal has, for example, a function of extracting EPG information from a broadcast wave in the reproducing section 4.

Figure 10:
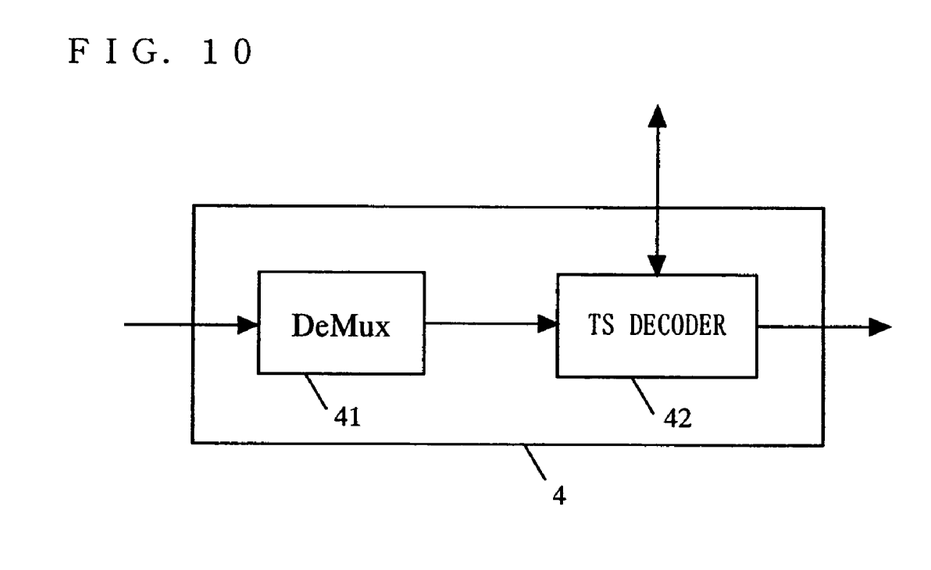
FIG. 10 is a block diagram showing an example of a specific constitution of the reproducing section 4.

FIG. 10 is a block diagram illustrating an example of a specific constitution of such reproducing section 4 as above described. Referring to FIG. 10, the reproducing section 4 includes a demux section 41 and a decoder section 42. The demux section 41 demultiplexes multiplexed broadcast information and extracts desired broadcast information. The decoder section 42 extracts, from the extracted broadcast information, and decodes the EPG information, and then outputs the decoded EPG information to the at-reception-recovery-time processing preprogramming control section 3a, and also decodes the extracted broadcast information into a video/sound corresponding to a channel selected by the user and then outputs the decoded video/sound to the display section 6. In this case, the at-reception-recovery-time processing preprogramming control section 3a receives the EPG information from the decoder section 42 as well as receives the current time from the timer section 8, and then makes the at-reception-recovery-time notification only during the time period the program designated by the user is being broadcasted. Thus, the broadcast information receiving terminal can choose whether or not to make the reception recovery notification for each program. The broadcast information receiving terminal may be equipped with an EPG information extracting section (not shown) for extracting the EPG information in isolation from the decoder section 42.

Moreover, although the broadcast information receiving terminal according to the present embodiment notifies, only during the time period designated by the user, that the reception of the broadcast information has been recovered, it is possible that the notification that the reception of the broadcast information has been recovered will not be made only during the time period designated by the user. Accordingly, the broadcast information receiving terminal has become more convenient for the user.

Third Embodiment

Figure 11:
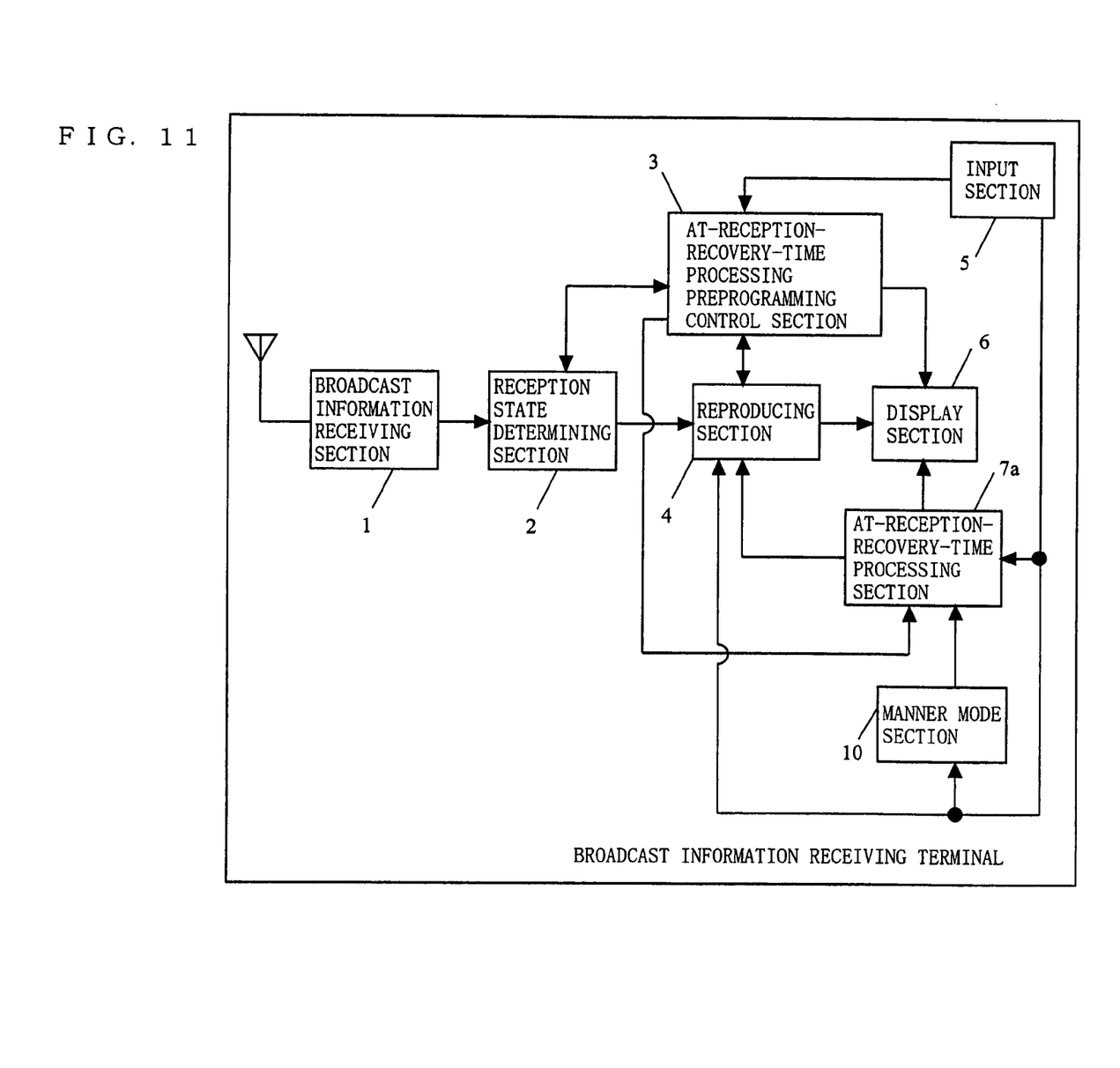
FIG. 11 is a block diagram illustrating an example of a constitution of the broadcast information receiving terminal according to a third embodiment of the present invention.

FIG. 11 is a block diagram illustrating an example of a constitution of a broadcast information receiving terminal according to a third embodiment of the present invention. Referring to FIG. 11, the broadcast information receiving terminal according to the third embodiment is further equipped with a manner mode section 10 as compared to the first and second embodiments.

Referring to FIG. 11, a manner mode is set in the manner mode section 10 using the input section 5. An at-reception-recovery-time processing section 7a changes a method for notifying the user that the reception of the broadcast information has been recovered (that is, a method for a reception recovery notification), depending on whether or not the manner mode is set in the manner mode section 10. For example, in the case where the manner mode is set in the manner mode section 10, the at-reception-recovery-time processing section 7a uses a method corresponding to the manner mode such as a vibrational function, as a method for the reception recovery notification. Alternatively, the at-reception-recovery-time processing section 7a will not make the reception recovery notification in the cases where the manner mode is set in the manner mode section 10.

The broadcast information receiving terminal may change a method for the reception recovery notification not only in the case of the manner mode being set but also in other cases. For example, when the reception recovery notification is made, the broadcast information receiving terminal determines whether another program is being viewed or not, and if determined to be viewed, the reception recovery notification may be made with such a method that does not interrupt the viewing. Alternatively, if another program is being viewed, the reception recovery notification will not be made.

Further, in the case where the broadcast information receiving terminal is a cellular phone, the broadcast information receiving terminal determines whether or not the user is making a voice call, and may change the method for making the reception recovery notification in the case of the voice call being made. For example, the broadcast information receiving terminal will not make the reception recovery notification in the case where the user is making the voice call. Alternatively, when a user is making a video-phone call, the broadcast information receiving terminal may notify the user of the reception recovery of the broadcast information by displaying the reception recovery notification on the display screen.

As described above, the broadcast information receiving terminal according to the third embodiment of the present invention is capable of changing the method for notifying the user of the reception recovery of the broadcast information (that is, the method for reception recovery notification), depending on the situation. As a result, the method for the reception recovery notification may be changed depending on whether or not the manner mode is set, and also the reception recovery notification may be made with such a method that does not interrupt the use of other functions when those other functions are used.

The broadcast information receiving terminal of the present information may, when the reception of the broadcast information has been recovered, record the broadcast information of the channel previously selected by the user. In this case, the broadcast information receiving terminal checks a remaining amount of a self-contained memory, and may keep from recording when the remaining amount of the memory is below a predetermined value. Alternatively, the broadcast information receiving terminal may apply a time-shift playback using the recorded broadcast information. Accordingly, even in the case where the user cannot view the broadcast information immediately after the reception recovery, viewing will become possible with the use of the recorded broadcast information, and thus the user's convenience increases.

Further, the broadcast information receiving terminal of the present invention may determine, according to a remaining amount of a battery, whether or not to make the reception recovery notification. In this case, for example, during an operation of step 9, the at-reception-recovery-time processing preprogramming control section 3 checks the remaining amount of the battery (not shown) before requesting the reception state determining section 2 to determine whether or not the broadcast information corresponding to the channel selected by the user is receivable. The at-reception-recovery-time processing preprogramming control section 3 may execute the termination processing of step 5 when the remaining amount of the battery is below the predetermined value.

Each of the processing procedures the broadcast information receiving terminal according to the first to third embodiments implements may be realized by causing a CPU to execute predetermined program data, which are able to cause a CPU to execute the above-described procedure, stored in a storage device (such as a ROM, a RAM, and a hard disk). In this case, the program data may be executed after it is stored in a storage device via a storage medium, or may be executed directly from the storage medium. Here, the storage medium includes a ROM, a RAM, a semiconductor memory such as a flash memory, a magnetic disk memory such as a flexible disk and a hard disk, an optical disk memory such as a CD-ROM, a DVD and a BD, a memory card, or the like. The storage medium is a notion including a communication medium such as a telephone line and a carrier line.

In the broadcast information receiving terminals described in the first to third embodiments, each of the reception state determining section 2, the at-reception-recovery-time processing preprogramming control section 3, and the at-reception-recovery-time processing section 7 may be realized as an LSI, which is an integrated circuit. Each of these sections may be separately constructed in a chip form, or all or some of the sections may be constructed in a chip form. The LSI as mentioned herein may be referred to as an IC, a system LSI, a super LSI, or an ultra LSI, etc., depending on the degree of integration.

Further, the method of integration is not limited to the LSI, and may be realized as a dedicated circuit or a general-purpose processor. Further, an FPGA (Field Programmable Gate Array) which can be programmed after LSI manufacture, or a reconfigurable processor enabling connections and settings of the circuit cells in the LSI to be reconfigured may be used. Further, in the case where another integration technology replacing the LSI appears due to improvement of a semiconductor technology or due to the emergence of another technology derived therefrom, integration of the functional blocks may be performed using the technology. For example, biotechnology may be applied.

INDUSTRIAL APPLICABILITY

The broadcast information receiving terminal of the present invention is applicable to a cellular phone terminal, a car navigation system, PDA and the like which are capable of receiving and reproducing the broadcast information.

The invention claimed is:

1. A broadcast information receiving terminal for receiving and reproducing broadcast information included in a broadcast wave, the broadcast information receiving terminal, comprising:
    a broadcast information receiving section for receiving the broadcast information included in the broadcast wave;
    a reception state determining section for determining a reception state of desired broadcast information included in the broadcast wave;
    a reproducing section for reproducing the desired broadcast information which is determined, by the reception state determining section, as receivable;
    a display section for displaying the broadcast information reproduced by the reproducing section;
    an at-reception-recovery-time processing preprogramming control section for determining, when a reception of the desired broadcast information which was determined, by the reception state determining section, as unreceivable has been recovered, whether or not to notify a user that a reception of the broadcast information has been recovered; and
    an at-reception-recovery-time-processing section for notifying the user, according to an instruction made by the at-reception-recovery-time processing preprogramming control section, that the reception of the desired broadcast information has been recovered.

2. The broadcast information receiving terminal according to claim 1, wherein
    the at-reception-recovery-time processing preprogramming control section is operable to
        accept a registration of a preprogramming for notifying the user, when the reception of the desired broadcast information has been recovered, that the reception of the broadcast information has been recovered,
        output an inquiry, to the reception state determining section, inquiring, only when the preprogramming is registered, whether or not the reception of the desired broadcast information which was determined as unreceivable has been recovered, and
        notify the user, when the reception state determining section determines that the reception of the desired broadcast information has been recovered, that the reception of the broadcast information has been recovered.

3. The broadcast information receiving terminal according to claim 1, wherein the at-reception-recovery-time processing preprogramming control section indicates on the display section, when the reception state determining section determines that the desired broadcast information is unreceivable, that the desired broadcast information is unreceivable.

4. The broadcast information receiving terminal according to claim 1, wherein
the at-reception-recovery-time processing preprogramming control section is operable to
accept a setting of a notification method for notifying the user that the reception of the desired broadcast information has been recovered, and
notify the user, when the reception of the desired broadcast information, which was determined as unreceivable by the reception state determining section, has been recovered, that the reception of the broadcast information has been recovered, by the set notification method.

5. The broadcast information receiving terminal according to claim 4, wherein the notification method is a notification method that is characterized by application of a vibrational alert function.

6. The broadcast information receiving terminal according to claim 1, further comprising a manner mode section having a manner mode set therein, wherein
the at-reception-recovery-time processing section changes, based on whether or not the manner mode is set in the manner mode section, the notification method for notifying the user that the reception of the desired broadcast information has been recovered.

7. The broadcast information receiving terminal according to claim 1, further comprising a timer section for outputting time information, wherein
the at-reception-recovery-time processing preprogramming control section is operable to
accept a setting of a time period during which the reception recovery of the broadcast information is to be notified, and
notify the user, based on the time information outputted from the timer section, only during the set time period, that the reception of the broadcast information has been recovered.

8. The broadcast information receiving terminal according to claim 1, wherein:
the reproducing section includes an electronic program information extraction section for extracting electronic program information from the broadcast wave; and
the at-reception-recovery-time processing preprogramming control section is operable to
accept a setting of a program, for which the reception recovery of the broadcast information is to be notified, and
notify the user, based on the extracted electronic program information, only for the set program, that the reception of the broadcast information has been recovered.

9. The broadcast information receiving terminal according to claim 1, wherein:
the at-reception-recovery-time processing section includes a recording section for recording the broadcast information to be reproduced by the reproducing section; and
the recording section records, when the reception of the broadcast information has been recovered, the recovered broadcast information.

10. A method for receiving and reproducing broadcast information included in a broadcast wave, comprising:
a broadcast information receiving step of receiving the broadcast information included in the broadcast wave;
a reception state determining step of determining a reception state of desired broadcast information included in the broadcast wave;
a reproducing step of reproducing the desired broadcast information determined, by the reception state determining step, as receivable;
a display step of displaying the broadcast information reproduced by the reproducing step;
a step of determining, when a reception of the desired broadcast information which was determined, by the reception state determining step, as unreceivable has been recovered, whether or not to notify a user that a reception of the broadcast information has been recovered; and
a step of notifying the user that the reception of the desired broadcast information has been recovered according to an instruction made by the determining step.

11. A program executed by a broadcast information receiving terminal for receiving and reproducing broadcast information included in a broadcast wave, comprising;
a broadcast information receiving step of receiving the broadcast information included in the broadcast wave;
a reception state determining step of determining a reception state of desired broadcast information included in the broadcast wave;
a reproducing step of reproducing the desired broadcast information which is determined, by the reception state determining step, as receivable;
a display step of displaying the broadcast information reproduced by the reproducing step;
a step of determining, when a reception of the desired broadcast information which was determined, by the reception state determining step, as unreceivable has been recovered, whether or not to notify a user that a reception of the broadcast information has been recovered; and
a step of notifying the user that the reception of the desired broadcast information has been recovered according to an instruction made by the determining step.

12. An integrated circuit of a broadcast information receiving terminal for receiving and reproducing broadcast information included in a broadcast wave, wherein:
the broadcast information receiving terminal comprises:
a broadcast information receiving section for receiving the broadcast information included in the broadcast wave;
a reproducing section for reproducing the received broadcast information; and
a display section for displaying the broadcast information reproduced by the reproducing section; and
the integrated circuit comprises:
a reception state determining section for determining a reception state of desired broadcast information included in the broadcast wave;
an at-reception-recovery-time processing preprogramming control section for determining, when a reception of the desired broadcast information which was determined, by the reception state determining section, as unreceivable has been recovered, whether or not to notify a user that a reception of the broadcast information has been recovered; and
an at-reception-recovery-time processing section for notifying the user, according to an instruction made by the at-reception-recovery-time processing preprogramming control section, that the reception of the desired broadcast information has been recovered.

\* \* \* \* \*